US011823812B2

(12) United States Patent
Kasugai et al.

(10) Patent No.: US 11,823,812 B2
(45) Date of Patent: Nov. 21, 2023

(54) WIRE HARNESS WIRE END PROTECTION METHOD

(71) Applicants: FURUKAWA ELECTRIC CO., LTD., Tokyo (JP); FURUKAWA AUTOMOTIVE SYSTEMS INC., Inukami-gun (JP); TOYOTA BOSHOKU KABUSHIKI KAISHA, Kariya (JP); TOYOTA JIDOSHA KABUSHIKI KAISHA, Toyota (JP)

(72) Inventors: Yumiko Kasugai, Inukami-gun (JP); Takuya Fujimura, Kariya (JP); Tomoya Takeuchi, Toyota (JP)

(73) Assignees: FURUKAWA ELECTRIC CO., LTD., Tokyo (JP); FURUKAWA AUTOMOTIVE SYSTEMS INC., Inukami-gun (JP); TOYOTA BOSHOKU KABUSHIKI KAISHA, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 541 days.

(21) Appl. No.: 17/058,461

(22) PCT Filed: May 20, 2019

(86) PCT No.: PCT/JP2019/019843
§ 371 (c)(1),
(2) Date: Nov. 24, 2020

(87) PCT Pub. No.: WO2019/225530
PCT Pub. Date: Nov. 28, 2019

(65) Prior Publication Data
US 2021/0202133 A1 Jul. 1, 2021

(30) Foreign Application Priority Data
May 25, 2018 (JP) .................. 2018-100318

(51) Int. Cl.
*H01B 13/012* (2006.01)
*H01R 9/22* (2006.01)
(Continued)

(52) U.S. Cl.
CPC ..... *H01B 13/01209* (2013.01); *H01B 13/012* (2013.01); *H01B 13/01263* (2013.01);
(Continued)

(58) Field of Classification Search
CPC ............... Y10T 29/49; Y10T 156/1002; Y10T 29/49117; H01B 13/012; H01B 13/01209; H01B 13/01263; H02G 15/02
(Continued)

(56) References Cited

U.S. PATENT DOCUMENTS 3,009,129 A  11/1961  Kirk, Jr.
9,017,110 B2 * 4/2015  Guillanton ........... H01R 9/0503
174/67
(Continued)

FOREIGN PATENT DOCUMENTS

CN    101026026 A    8/2007
CN    102227856 A    10/2011
(Continued)

OTHER PUBLICATIONS

International Search Report dated Aug. 13, 2019 in PCT/JP2019/019843 filed May 20, 2019, 1 page.
(Continued)

*Primary Examiner* — Thiem D Phan
(74) *Attorney, Agent, or Firm* — Oblon, McClelland, Maier & Neustadt, L.L.P.

(57) ABSTRACT

A wire end of a wire harness is protected. The wire harness includes a wire bundle and a connector connected therewith. The wire bundle includes the wire end, and the wire end includes a bent portion and faces the connector. First, a sheet
(Continued)

member is folded perpendicularly to a wire lead-out surface of the connector, thereby forming, concurrently, counter sides facing the wire lead-out surface, side surface covering portions, and a tip end protection portion. Next, the side surface covering portions are folded along a top protection portion formation portion, thereby forming, concurrently, side surface protection portions, a top protection portion and an extending portion. Next, a wire end protection portion is secured, with a pressure-sensitive adhesive tape or the like, to a wire bundle portion while the relative position of the counter sides with respect to the wire lead-out surface is maintained.

2 Claims, 9 Drawing Sheets (51) Int. Cl.
*H02G 3/04* (2006.01)
*H02G 15/02* (2006.01)

(52) U.S. Cl.
CPC ........... *H01R 9/223* (2013.01); *H02G 3/0406* (2013.01); *H02G 15/02* (2013.01); *Y10T 29/49117* (2015.01)

(58) Field of Classification Search
USPC .................................... 29/825, 855, 859, 887
See application file for complete search history.

(56) References Cited

U.S. PATENT DOCUMENTS

| | | | |
|---|---|---|---|
| 10,457,317 B2 * | 10/2019 | Takagi | ................ B62D 5/0409 |
| 2017/0012384 A1 | 1/2017 | Sugino | |
| 2019/0356079 A1 | 11/2019 | Hasui | |

FOREIGN PATENT DOCUMENTS

| | | | |
|---|---|---|---|
| CN | 106340750 A | 1/2017 | |
| JP | 11-213786 A | 8/1999 | |
| JP | 2000-280837 A | 10/2000 | |
| JP | 2012-221805 A | 11/2012 | |
| JP | 2012-234659 A | 11/2012 | |
| JP | 2014-63619 A | 4/2014 | |
| JP | 2014-207769 A | 10/2014 | |
| JP | 2017-21950 A | 1/2017 | |
| WO | WO 2018/043130 A1 | 3/2018 | |

OTHER PUBLICATIONS

Extended European Search Report dated Feb. 3, 2022 in European Patent Application No. 19807601.0, 9 pages.
Combined Chinese Office Action and Search Report dated Aug. 2, 2021 in corresponding Chinese Patent Application No. 201980032599.8 (with English Translation), 13 pages.

* cited by examiner

WIRE HARNESS WIRE END PROTECTION METHOD

TECHNICAL FIELD

The present invention relates to a technology for protecting a wire end of a wire harness, and more specifically, to protection of a base portion for a connector of a wire harness, the wire harness including a wire bundle and the connector connected therewith, the wire bundle including the wire end, the wire end including a bent portion.

BACKGROUND ART

In a connector in which a wire bundle is bent in the vicinity of a wire lead-out portion thereof, namely, in a so-called horizontal connector, the bent portion of the wire bundle is provided with a cover in order to protect electric wires against dust or the like and also in order to restrict the bending shape or the orientation of the wire bundle.

One conventional example of such a cover is disclosed in Patent Document 1. The cover disclosed in Patent Document 1 includes a portion to be fit into the connector, a portion accommodating the bent portion, and a portion from which the electric wires are led out. The cover includes a main body cover and a lid cover, which are molded of a synthetic resin.

Therefore, a specific cover is needed for each of sizes and shapes of the connector, each of bending angles, and each of widths of the wire bundles. This undesirably increases the number of types of covers and the number of dies or molds needed for producing the covers.

In addition to the horizontal connector, there is a connector to which the wire bundle is connected linearly. For such a type of connector, Patent Document 2 discloses a structure in which a connector-side wire end of the wire bundle is covered with a sheet member (PVC sheet). The sheet member is trapezoidal as seen in a plan view, and has a pressure-sensitive adhesive applied to oblique sides thereof. In order to be secured, the sheet member is wound in a state where both of two ends of the sheet member respectively cover an end of the connector and an end of a protective tube protecting the electric wires, by use of the pressure-sensitive adhesive. The sheet member is secured in a state where the length of a portion of the electric wires that is covered with the sheet member is controlled such that the wires are not taut. In this manner, the sheet member is secured to protect the electric wires without causing the electric wires to be taut.

However, in the case where this structure is applied to a so-called horizontal connector, it is difficult to realize both of covering of the bent portion of the electric wires and covering of an end portion of the connector with the sheet member.

CITATION LIST

Patent Literature

Patent Document 1: Japanese Laid-Open Patent Publication No. 2012-234659
Patent Document 2: Japanese Laid-Open Patent Publication No. Hei 11-213786

SUMMARY OF INVENTION

Technical Problem

The present invention has a main object of providing a wire harness wire end protection method, with which a bent portion of electric wires is protected at a high versatility by a protective member having a simple shape.

Solution to Problem

The above objective is achieved by a wire harness wire end protection method protecting a wire end of a wire harness, the wire harness including a wire bundle and a connector connected therewith, the wire bundle including the wire end, the wire end including a bent portion and facing the connector. The method includes a first covering step of folding a sheet member formed of a foldable material along a phantom line perpendicular to a wire lead-out surface of the connector, thereby forming a tip end protection portion covering a tip end, in a longitudinal direction, of the bent portion of the wire bundle, forming counter sides that are each a part of an outer circumferential edge of the sheet member, that face the wire lead-out surface of the connector, and that are respectively located along two side surfaces of the bent portion, and forming side surface covering portions that are respectively provided with the counter sides and cover the two side surfaces of the bent portion, the tip end protection portion, the counter sides and the side surface covering portions being formed concurrently; a second covering step of folding, toward the wire lead-out surface, a portion of the side surface covering portions that extends beyond the bent portion in a direction opposite to the wire lead-out surface, thereby forming a top protection portion covering a portion of the bent portion that is opposite to the wire lead-out surface, and also forming the side surface covering portions into side surface protection portions covering the side surfaces of the bent portion; and a securing step of securing the sheet member to a wire bundle portion while keeping the counter sides in a facing state of facing the wire lead-out surface.

The "folding" of the phrases "folding a sheet member . . . along a phantom line perpendicular to a wire lead-out surface" and "folding, toward the wire lead-out surface" encompasses bending and curving.

The expression "facing state" refers to a state where the counter sides and the wire lead-out surface face each other, and encompasses a case where the counter sides are close to the wire lead-out surface and a case where the counter sides contact the wire lead-out surface.

The expression "wire bundle portion" refers to an element that is not the connector. In the case where the wire bundle is provided with an outer case, the "wire bundle portion" refers to the outer case. Hereinafter, the expression "wire portion" is also used.

With the above-described structure, the wire end protection portion protecting the wire end of the wire harness is formed by the first covering step and the second covering step, in which the sheet member is mainly caused to cover the bent portion of the wire bundle and is folded. Then, the wire end protection portion is secured to the wire bundle in the securing step by an appropriate securing element such as a pressure-sensitive adhesive or the like. With such a simple work, the wire end of the wire harness is protected.

In an embodiment of the present invention, the counter sides may be put into contact with the wire lead-out surface in the first covering step, the second covering step or the securing step. The counter sides face the wire lead-out surface. Therefore, the relative positions of the counter sides and the wire lead-out surface are restricted more positively from being changed while the workability is not changed.

Advantageous Effects of Invention

According to the present invention, a bent portion of electric wires is protected at a high versatility by a protective member having a simple shape.

DESCRIPTION OF EMBODIMENTS

Hereinafter, an embodiment in which the present invention is carried out will be described with reference to the drawings.

Figure 1:
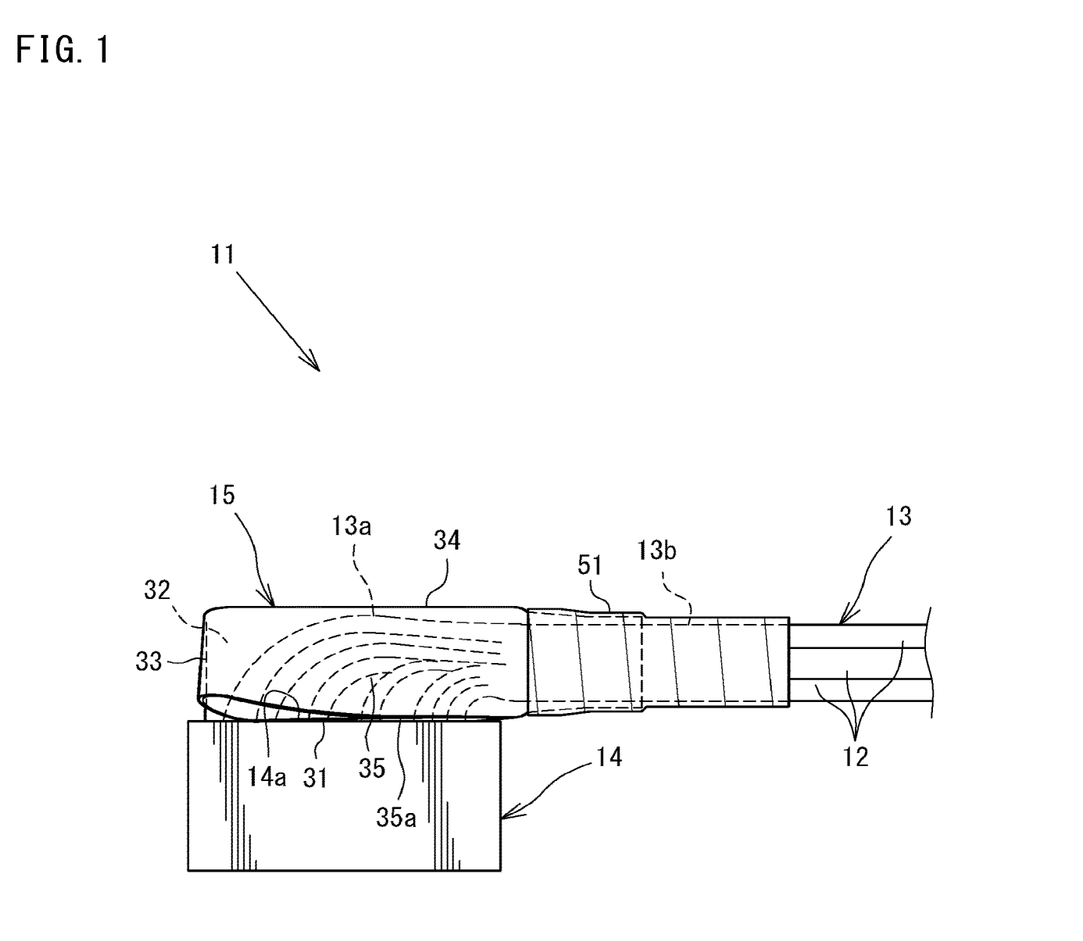
FIG. 1 is a side view of an example of wire harness wire end protection structure to which the present invention is applicable.

FIG. 1 is a side view of an example of wire end of a wire harness 11, to which a wire harness wire end protection method in this embodiment is applicable. The wire harness 11 includes a wire bundle 13 including a plurality of electric wires 12 assembled together, and a connector 14, to which a terminal (not shown) connected with the wire end of the electric wires 12 is inserted and held. The wire end of the wire bundle 13 facing the connector 14 is bent to form a bent portion 13a in the vicinity of a wire lead-out surface 14a of the connector 14.

The bent portion 13a is formed in the case where the wire bundle 13 is led out in a horizontal direction in correspondence with the wiring of the wire harness 11 or in the case where if the electric wires 12 are led out linearly from the wire lead-out surface 14a of the connector 14, namely, in a direction perpendicular to the wire lead-out surface 14a, interference occurs with other elements. Therefore, the bent portion 13a may be bent at an angle close to the right angle as shown in FIG. 1 or at an obtuse angle.

At the wire end of the wire harness 11, a wire end protection portion 15 covering the bent portion 13a is formed in order to protect a base portion for the connector, namely, the bent portion 13a of the electric wires 12, against dust or the like, or in order to restrict the bending shape of the bent portion 13a or the orientation of the wire bundle 13.

Figure 2:
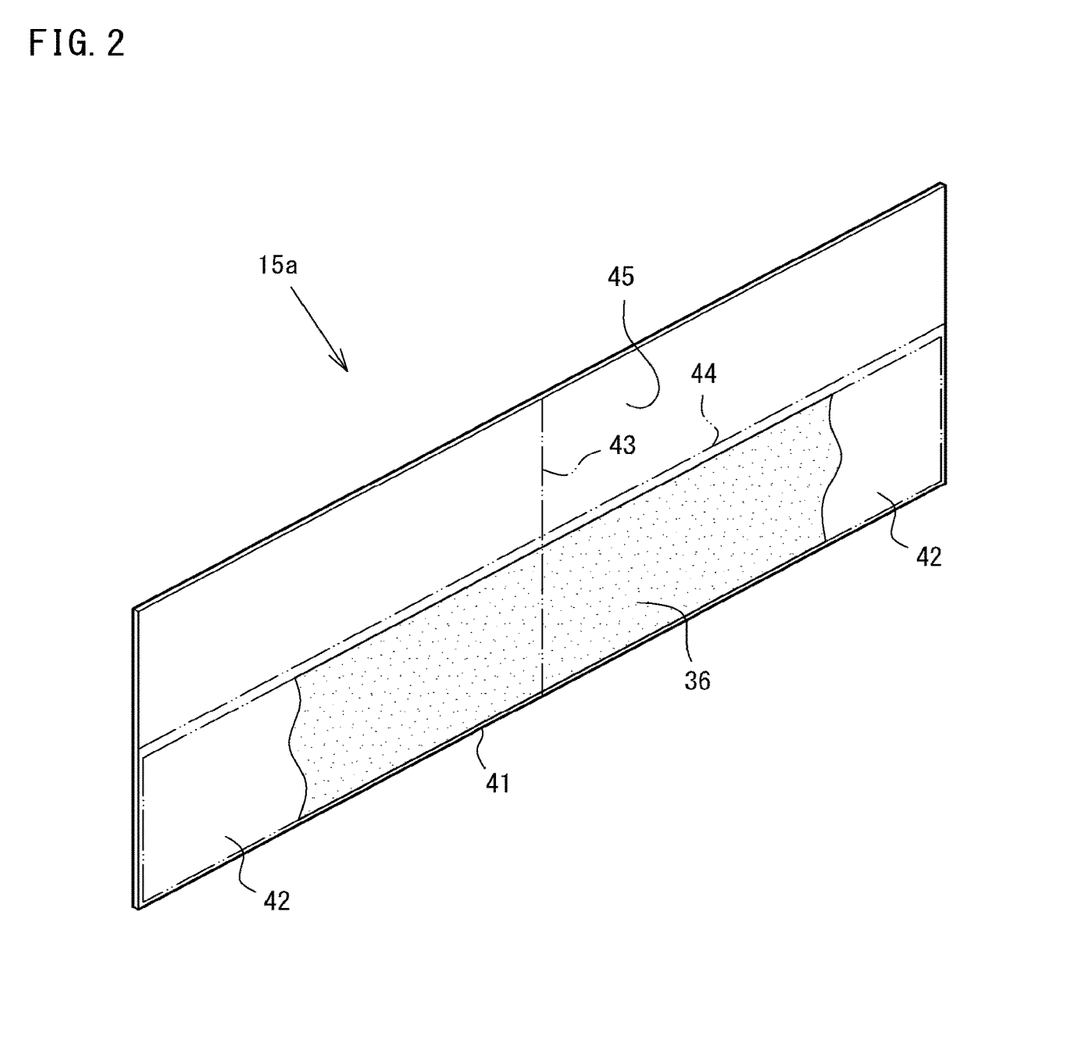
FIG. 2 is a perspective view of a rear surface of a sheet member.

As shown in FIG. 2, the wire end protection portion 15 is formed of a sheet member 15a of a foldable material. The material usable for the sheet member 15a is softer than the material of the connector 14, and may specifically be, for example, a synthetic resin, synthetic rubber, natural rubber or the like. Alternatively, a composite material such as, for example, waterproof cloth formed of a stack of fabric cloth such as woven fabric cloth or non-woven fabric cloth and a synthetic resin or rubber may be used.

The wire end protection portion 15 formed of the sheet member 15a includes counter sides 31, side surface protection portions 32, a tip end protection portion 33, and a top protection portion 34. The counter sides 31 are each a part of an outer circumferential edge of the sheet member 15a, face the wire lead-out surface 14a of the connector 14, and are respectively located along two side surfaces of the bent portion 13a. The side surface protection portions 32 are provided with the counter sides 31, and respectively cover the two side surfaces of the bent portion 13a. The tip end protection portion 33 is a folding portion that is continued from the two side surface protection portions 32, covers a tip end, in a longitudinal direction, of the bent portion 13a of the wire bundle 13, and is perpendicular to the wire lead-out surface 14a. The top protection portion 34 is continued from the side surface protection portions 32, and covers the bent portion 13a at a position opposite to the wire lead-out surface 14a. In addition, an extending portion 35 is continued from the top protection portion 34 and extends by a length sufficient to be folded back from the top protection portion 34 toward the wire lead-out surface 14a. The extending portion 35 is set to have a length that allows a portion 35a at a tip end of the extending direction thereof to contact the wire lead-out surface 14a, or is set to be shorter than that. The portion 35a is an end of the sheet member 15a in the case shown in the figure, or is a folded-back portion in the case where the end of the sheet member 15a is folded back.

The wire end protection portion 15 having such a structure is secured to a wire bundle 13 portion in a state where the counter sides 31 face the wire lead-out surface 14a.

Now, the shape of the sheet member 15a used to form the wire end protection portion 15 will be described. As shown in FIG. 2, the sheet member 15a is rectangular. Namely, in the case where the sheet member 15a is folded into two along a phantom line perpendicular to the wire lead-out surface 14a of the connector 14 and along a phantom line parallel to the wire lead-out surface 14a, in other words, in the case where the sheet member 15a is folded along two phantom lines perpendicular, or generally perpendicular, to each other, the side surface protection portions 32 accommodate a side-view shape of the bent portion 13a. A simplest shape of the sheet member 15a is quadrangular, more specifically, is rectangular. The terms "perpendicular" and "parallel" are not used in their strict meanings, but each encompass states close thereto.

The side-view shape of the bent portion 13a has one end corresponding to the wire lead-out surface 14a of the connector 14, extends from the one end as drawing an arc and then is connected with a linear portion 13b (see FIG. 1). As can be seen, the side-view shape of bent portion 13a is like an arcked shape from which a central portion thereof is cut off. The linear portion 13b is a portion where the electric wires 12 are assembled into a bundle. Thus, the quadrangular shape, which is plainest and simplest, is adopted as the shape accommodating the side-view shape of the bent portion 13a.

Regarding the rectangular sheet member 15a shown in FIG. 2, one of two longer sides forms linear counter side formation portions 41, which become the counter sides 31 when the wire end protection portion 15 is formed. Among portions above and below a central portion, in the longitudinal direction, of the sheet member 15a, the portions closer to the counter sides 31 are side surface protection portion formation portions 42, which become the side surface protection portions 32 when the wire end protection portion 15 is formed.

A portion that is between the two counter side formation portions 41 and extends in a direction perpendicular to the longer side is a tip end protection portion formation portion 43, which becomes the tip end protection portion 33 when the wire end protection portion 15 is formed. When the wire end protection portion 15 is formed, the tip end protection portion formation portion 43 is the center of folding and matches one of the above-described phantom lines. The sheet member 15a may be folded at an acute angle or in a curve. From the point of view of making the wire end protection portion 15 compact, it is preferred that the sheet member 15a is folded so as to be in close contact with the bent portion 13a.

In FIG. 2, the tip end protection portion formation portion 43 is at a middle position, in the longitudinal direction, of the sheet member 15a. It is sufficient that both of the side surface protection portions 32 cover the bent portion 13a. Only one of the side surface protection portions 32 may cover the linear portion 13b of the wire bundle 13. In this case, the position of the tip end protection portion formation portion 43 is shifted in either direction in the longitudinal direction from the middle position.

A portion that is at a middle position, in the shorter side direction, of the sheet member 15a and extends parallel to the longer side is a top protection portion formation portion 44, which becomes the top protection portion 34 when the wire end protection portion 15 is formed. As described above, in the example shown in FIG. 1, the longer side of the sheet member 15a that is the tip end of the extending portion 35 contacts the wire lead-out surface 14a. Therefore, in FIG. 2, the top protection portion formation portion 44 is set at the middle position in the shorter-side direction. In the case where the form of the extending portion 35 is different from that of the example shown in FIG. 1, the position of the top protection portion formation portion 44 is shifted in either direction in the shorter-side direction from the middle position.

Like the tip end protection portion 33, the top protection portion 34 may be folded at an acute angle or in a curve. In the example shown in the figure, the phantom line representing the top protection portion formation portion 44 is a straight phantom line. The top protection portion formation portion 44 is not restricted to be at a certain position as being represented as a line. From the point of view of keeping the shape of the top protection portion 34, it is preferred that the top protection portion 34 is in contact with a top portion of the bent portion 13a.

A portion of the sheet member 15a that is opposite to the counter side formation portions 41 with respect to the top protection portion formation portion 44 is an extending portion formation portion 45, which becomes the extending portion 35 when the wire end protection portion 15 is formed.

Figure 3:
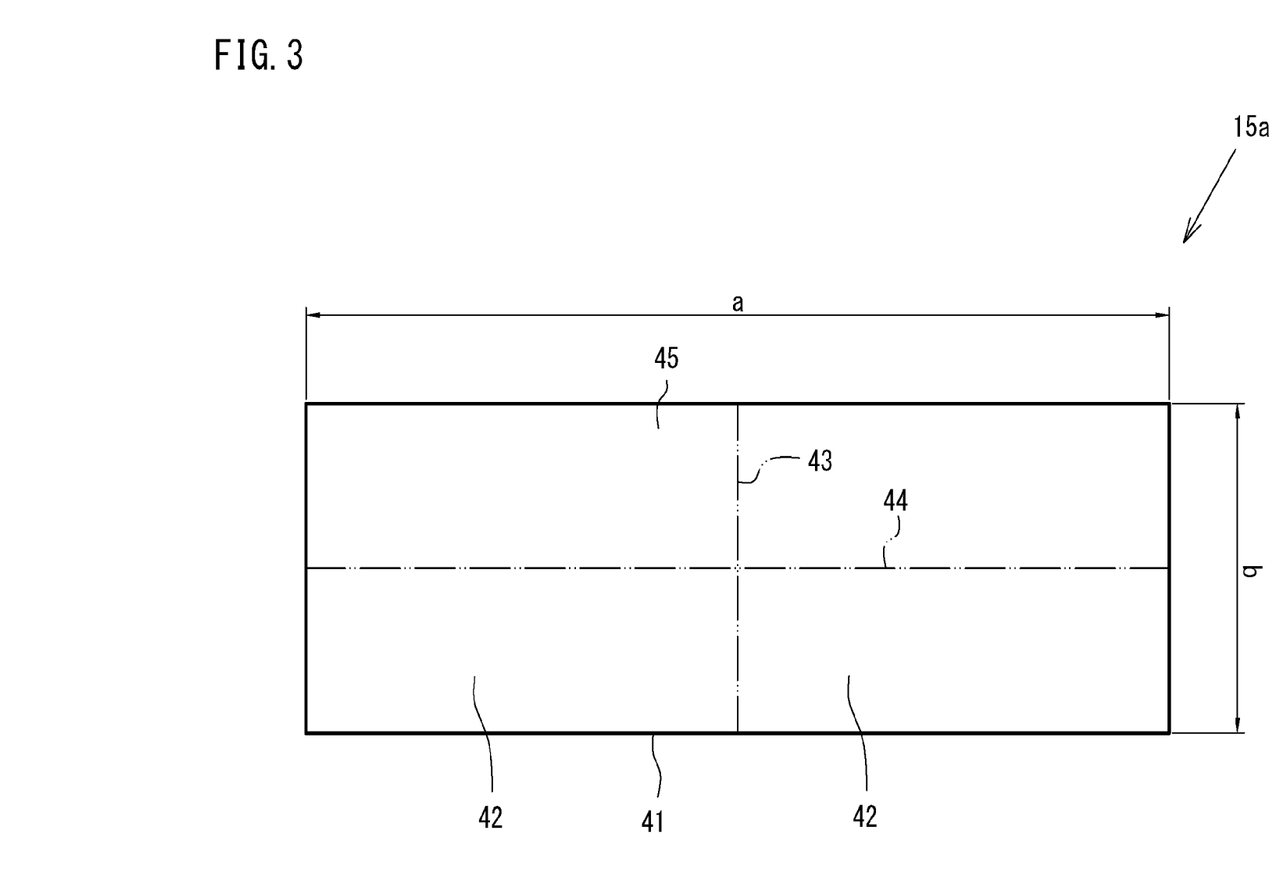
FIG. 3 shows a front surface of the sheet member.

With reference to FIG. 3, the shape and the size of the sheet member 15a shown in FIG. 2 will be specifically described. FIG. 3 shows a front surface of the sheet member 15a. Length "a" of the sheet member 15a in the longitudinal direction is set to be longer than the length of the side-view shape of the bent portion 13a. Specifically, length "a" is at least a sum of the length of the side-view shape of the bent portion 13a, the thickness of the bent portion 13a, and an appropriate length of an end portion of the linear portion 13b. The "appropriate length of an end portion of the linear portion 13b" is a length that allows the wire end protection portion 15 to be secured to the wire bundle 13 stably, and is set to be, for example, longer than the width of a securing element. In the case where the securing element is a pressure-sensitive adhesive tape 51 (see FIG. 1), the "appropriate length of an end portion of the linear portion 13b" is set to be about twice the width of the pressure-sensitive adhesive tape 51.

Length "a" of the sheet member 15a in the longitudinal direction is equal to the sum of the lengths of two counter sides 31. Described in relation with the wire lead-out surface 14a of the connector 14, length "a" is set to be about twice the length of the wire lead-out surface 14a in a direction corresponding to the length direction of the counter sides 31 (twice the length of the wire lead-out surface 14a), or to be longer than twice the length of the wire lead-out surface 14a.

Length "b" of the sheet member 15a in the shorter-side direction is related with the width of the wire bundle 13 and the bending angle of the bent portion 13a (angle of elevation from the wire lead-out surface 14a) or the size of the bent portion 13a. Described in relation with the width of the wire bundle 13, length "b" is set to be at least longer than the outer circumferential length of the linear portion 13b of the wire bundle 13. Described in relation with the bent portion 13a, length "b" is set to accommodate the bent portion 13a in any of a plurality of forms. The larger the bending angle of the bent portion 13a is, the longer length "b" needs to be. Especially in the case where the extending portion formation portion 45 is formed as described above, length "b" may be set to be longer than the height of the bent portion 13a (maximum size thereof in a direction perpendicular to the wire lead-out surface 14a), specifically, may be set to be, for example, about 1.5 times to about twice the height of the bent portion 13a.

The thickness of the sheet member 15a varies in accordance with the material. In the case where, for example, a synthetic resin sheet of black soft polyvinylchloride or the like is used, the thickness of the sheet member 15a may be, for example, about 0.3 mm to about 0.5 mm. In the case where any other general material is used, it is preferred that the thickness of the sheet member 15a is about 0.2 mm to about 1.0 mm.

As shown in FIG. 2, the sheet member 15a having such a shape includes a pressure-sensitive adhesive 36, which adheres to the bent portion 13a, provided on a rear surface (i.e., surface facing the wire bundle 13) of the side surface protection portions 32, namely, the side surface protection portion formation portions 42. The pressure-sensitive adhesive 36 may be prepared in advance as being applied to release paper (not shown), or may be applied each time when securing is needed. The pressure-sensitive adhesive 36 may be formed on the entirety of the side surface protection portion formation portions 42 as shown in FIG. 2, or on a part of the side surface protection portion formation portions 42.

Figure 4:
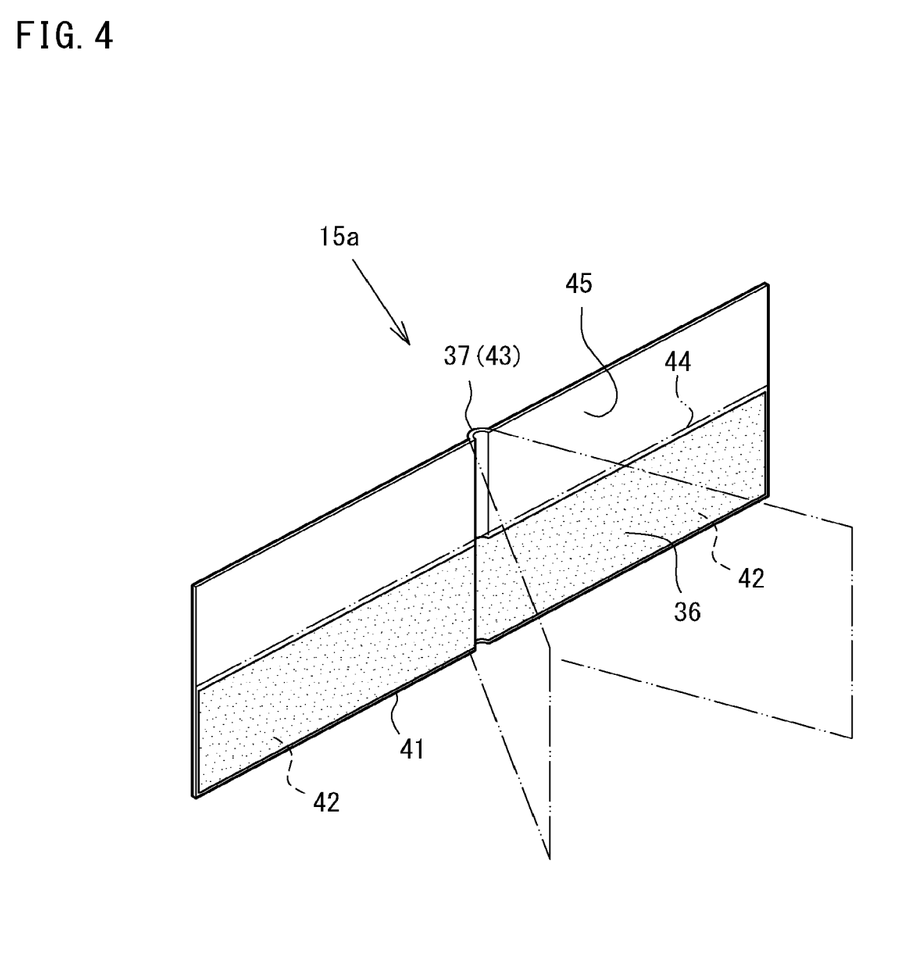
FIG. 4 is a perspective view of a rear surface of a sheet member in another example.

As shown in FIG. 4, a folding line 37 may be formed on the tip end protection portion formation portion 34 of the sheet member 15a. FIG. 4 is a perspective view of a rear surface of the sheet member 15a. The folding line 37 is formed in such a direction as to allow folded portions of the rear surface to be stacked on each other. The folding line 37 is formed as follows, for example. A sheet-like member is punched out to form the sheet member 15a, and then pre-molding is performed, for example, the sheet member 15a is pressurized while being heated. The folding line 37 may be of one line as shown in FIG. 4, or may be of a plurality of lines. The folding line 37 makes it easy to perform the work of folding. When the wire end protection portion 15 is attached to cover the bent portion 13a, the folding line 37 makes it easy to keep the covered state.

The sheet member 15a having the above-described structure is attached to the bent portion 13a of the wire harness 11 by the steps described below to protect the wire end of the wire harness 11.

The attachment of the bent portion 13a includes a first covering step, a second covering step and a securing step. In the first covering step, the sheet member 15a is folded into two along a line perpendicular to the wire lead-out surface 14a of the connector 14, namely, along the tip end protection portion formation portion 43, to form the tip end protection portion 33, the counter sides 31, and side surface covering portions. The tip end protection portion 33 covers the tip end, in the longitudinal direction, of the bent portion 13a of the wire bundle 13. The counter sides 31 are each a part of the outer circumferential edge of the sheet member 15a, face the wire lead-out surface 14a of the connector 14, and are respectively located along the two side surfaces of the bent portion 13a. The side surface covering portions are provided with the counter sides 31, and respectively cover the two side surfaces of the bent portion 13a. In the second covering step, a portion of the sheet member 15a that extends beyond the bent portion 13a in a direction opposite to the wire lead-out surface 14a, namely, the extending portion formation portion 45, is folded back toward the wire lead-out surface 14a to form the top protection portion 34 covering a portion of the bent portion 13a that is opposite to the wire lead-out surface 14a, and to form the side surface protection portions 32 and the extending portion 35 covering the side surfaces of the bent portion 13a out of the side surface covering portions formed in the first covering step. In the securing step, the wire end protection portion 15 is secured to the wire bundle 13 portion while the counter sides 31 are kept in a facing state of facing the wire lead-out surface 14a.

FIG. 5 shows a procedure of a method for protecting the wire end of the wire harness 11. First, the sheet member 15a is prepared (FIG. 5(a)). The sheet member 15a is folded into two along the tip end protection portion formation portion 43 (FIG. 5(b)).

Figure 5A:
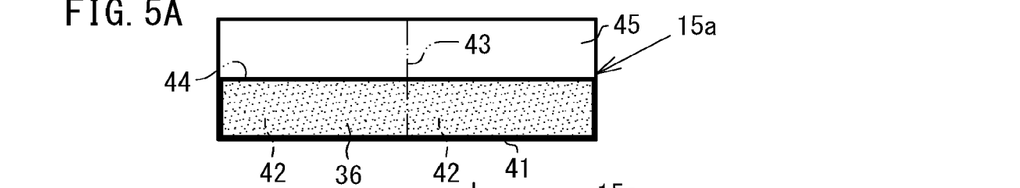
FIG. 5 shows a procedure of a wire harness wire end protection method.
Figure 5B:
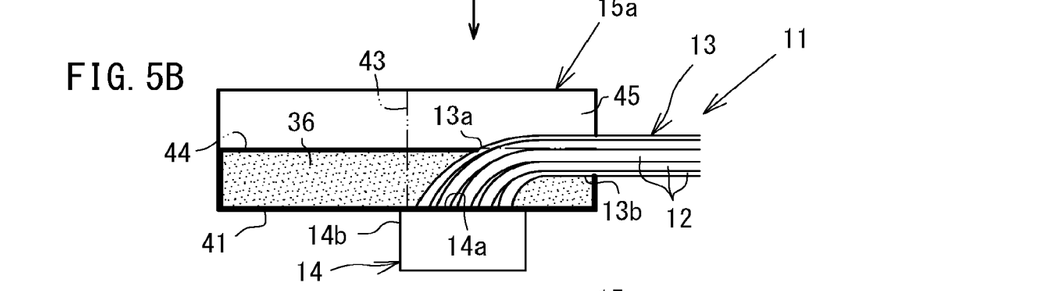

In synchronization with the folding, the side surfaces of the bent portion 13a are covered with the sheet member 15a (FIG. 5(b)). At this point, the tip end protection portion formation portion 43 of the sheet member 15a is located on the wire lead-out surface 14a without protruding from one of side surfaces of the connector 14 that is at a tip end in the longitudinal direction of the wire bundle 13, namely, without protruding from a side surface 14b opposite to the direction in which the linear portion 13b of the wire bundle 13 extends. Then, the counter side formation portions 41 of the sheet member 15a are caused to face the wire lead-out surface 14a of the connector 14 (FIG. 5(c)).

Figure 5C:
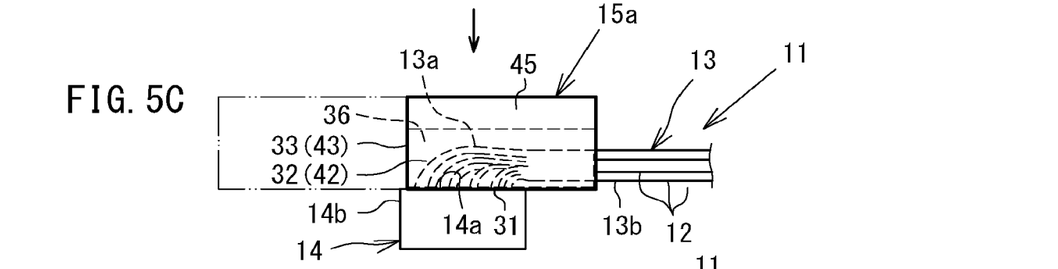

While the sheet member 15a is folded into two and caused to cover the bent portion 13a, the side surface protection portion formation portions 42 are secured to the electric wires 12 with the pressure-sensitive adhesive 36 applied to the side surface protection portion formation portions 42. This stabilizes the position of the sheet member 15a with respect to the bent portion 13a. Thus, an appropriate work is performed simply.

The counter side formation portions 41 may contact, or may be close to, the wire lead-out surface 14a. It is preferred that the counter side formation portions 41 may contact the wire lead-out surface 14a.

The procedure described so far corresponds to the first covering step. As described above, the tip end protection portion 33, the counter sides 31, and the side surface covering portions, which become the side surface protection portions 32, the top protection portion 34 and the extending portion 35 in a later step, are formed.

Figure 5D:
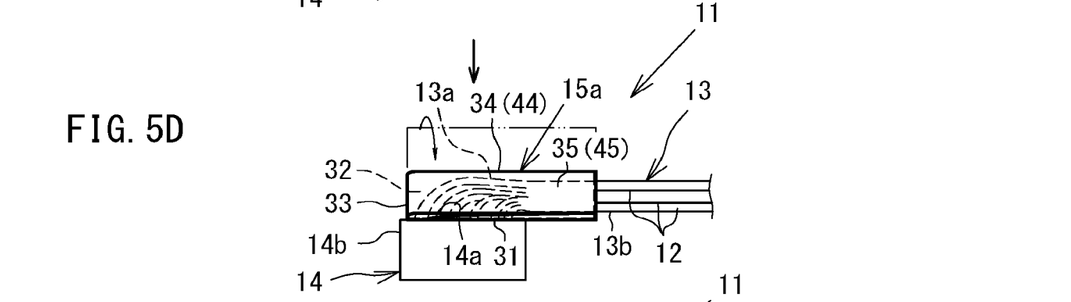

Next, the extending portion formation portion 45 of the sheet member 15a, which is above the portion corresponding to the bent portion 13a, is folded along the top protection portion formation portion 44 downward in the figure, namely, folded back toward the wire lead-out surface 14a to cover the bent portion 13a (FIG. 5(d)). At this point, the portion above the portion corresponding to the bent portion 13a, and also all the portions that may be folded back, are folded back. Thus, the portions protruding from the side-view shape of the bent portion 13a or the extending portion formation portion 45 is put on the bent portion 13a, such that the side-view shape of the sheet member 15a is closer to the side-view shape of the bent portion 13a.

Like the tip end protection portion formation portion 43, the top protection portion formation portion 44 may be folded at an acute angle or in a curve.

The procedure described so far corresponds to the second covering step. As described above, the top protection portion 34, the side surface protection portions 32, and the extending portion 35 are formed. As a result, the wire end protection portion 15 protecting the wire end of the wire harness 11 is formed.

In this state, the securing step is performed. In the securing step, the wire end protection portion 15 is secured to the wire bundle 13 portion while the positional relationship of the counter side formation portions 41 with respect to the wire lead-out surface 14a is kept (FIG. 5(e)). In the securing step, both ends of the sheet member 15a in the longitudinal direction, namely, portions far from the tip end protection portion formation portion 43 are wound around the wire bundle 13 portion together with the counter side formation portions 41, and the wound portions are secured to the wire bundle 13 portion with a securing element. In this example, the above-described "wire bundle portion", to which the wound portions are secured, is the wire bundle 13.

Figure 5E:
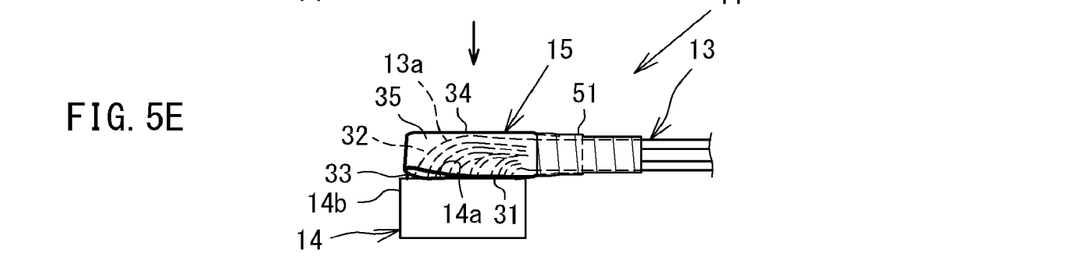

The securing element may be the pressure-sensitive adhesive tape 51, which is easiest and most reliable to use as a securing element. The pressure-sensitive adhesive tape 51 is wound around the portions that are put around the wire bundle 13, while pressing the wire bundle 13. The pressure-sensitive adhesive tape 51 is also caused to protrude from the sheet member 15a to directly adhere to the wire bundle 13. The pressure-sensitive adhesive tape 51 is wound around the linear portion 13b adjacent to the bent portion 13a, among the plurality of portions of the wire bundle 13. It is preferred that the pressure-sensitive adhesive tape 51 is caused to adhere to, and to be secured to, the wire bundle 13 as well as the sheet member 15a as described above. Namely, it is desired that the pressure-sensitive adhesive tape 51 is wound as bridging over the border between the end of the sheet member 15a and the wire bundle 13.

As can be seen, the sheet member 15a is secured only to the wire bundle 13 portion, but is not secured to the connector 14.

Figure 6:
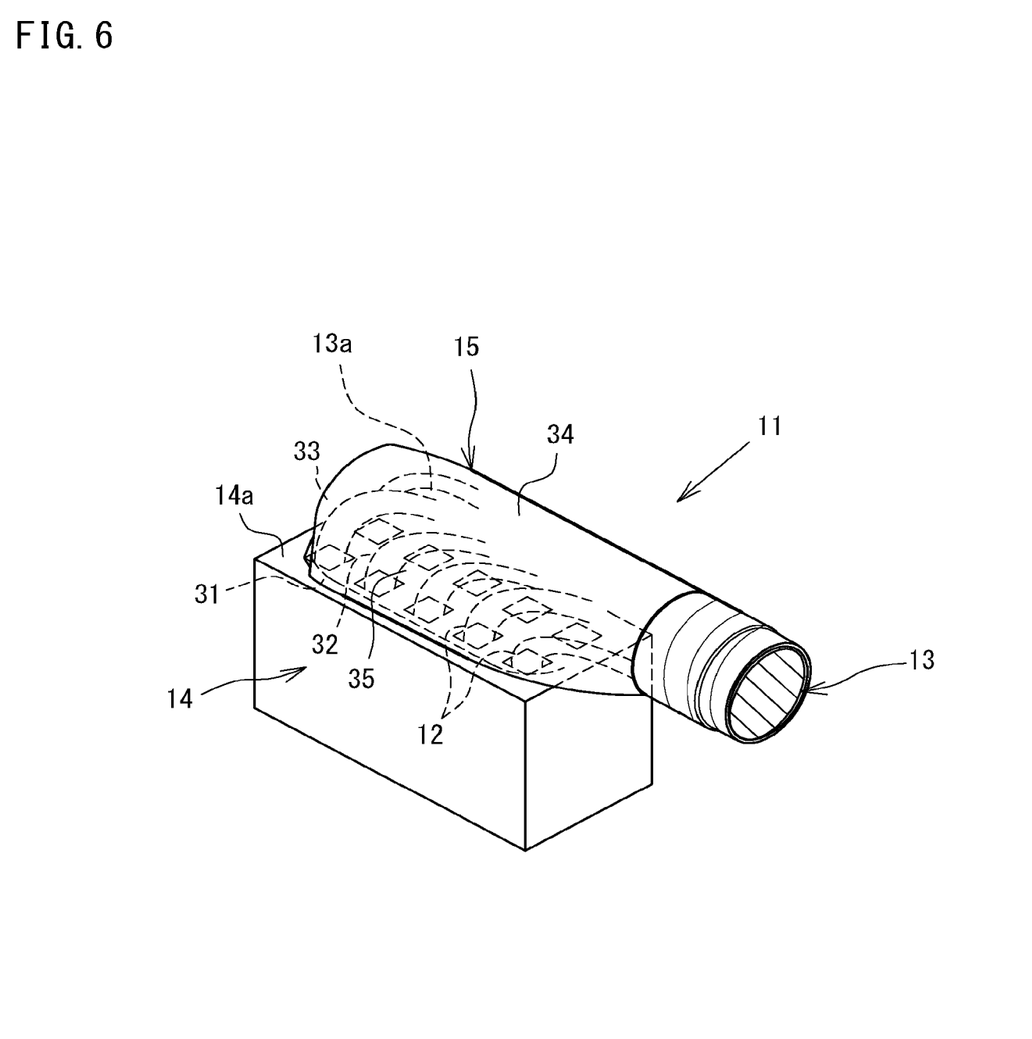
FIG. 6 is a partially cross-sectioned perspective view of a wire harness wire end protection structure to which the present invention is applicable.

As shown in FIG. 6, in a wire end protection structure of the wire harness 11 provided by the above-described wire end protection method for the wire harness 11, the wire end protection portion 15 secured to the linear portion 13b, of the wire bundle 13, in which the electric wires 12 are assembled, covers the bent portion 13a while causing the counter sides 31 to be pressed onto, or to be close to, the wire lead-out surface 14a of the connector 14.

Therefore, the wire end protection portion 15 protects the electric wires 12 against entrance of dust or the like into the bent portion 13a from outside. In addition, when the relative positions of the wire bundle 13 and the connector 14 are about to change, the counter sides 31 of the wire end protection portion 15 contact the wire lead-out surface 14a. As a result, a cooperation of the side surface protection portions 32, the tip end protection portion 33 continued from the side surface protection portions 32, and the top protection portion 34 prevents or suppresses the change of the relative positions of the wire bundle 13 and the connector 14. In this manner, the bending shape of the bent portion 13a and the orientation of the wire bundle 13 are restricted. The degree of prevention or suppression of the change of the relative positions varies in accordance with the positional relationship between the counter sides 31 and the wire lead-out surface 14a that is set when the sheet member 15a is secured. Anyway, the above-described restriction on the change of the relative positions protects the electric wires 12 and maintains the shape of the bent portion 13a. In the case where the counter sides 31 are put into contact with the wire lead-out surface 14a, the change of the relative positions is restricted more positively.

As described above, the portion, of the sheet member 15a, covering the side surfaces of the bent portion 13a (side surface protection portion formation portions 42) has a quadrangular shape accommodating the side-view shape of the bent portion 13a, and includes a protruding portion protruding from the side-view shape of the bent portion 13a and the extending portion formation portion 45, which is extended intentionally. Therefore, the sheet member 15a is caused to cover the bent portion 13a, and then the protruding portion and the extending portion formation portion 45 are folded back, so that the portions covering the bent portion 13a are reinforced. As a result, the above-described restriction on the change of the relative positions is performed more firmly and more certainly.

Moreover, the protruding portion and the extending portion formation portion 45 may be folded back in synchronization with the securing step, which is performed after the second covering step. Thus, even though the work of folding back is needed, the load on the work is small and the work may be performed smoothly.

The sheet member 15a is secured only to the wire bundle 13 portion, but is not secured to the connector 14. This improves the workability.

Figure 7:
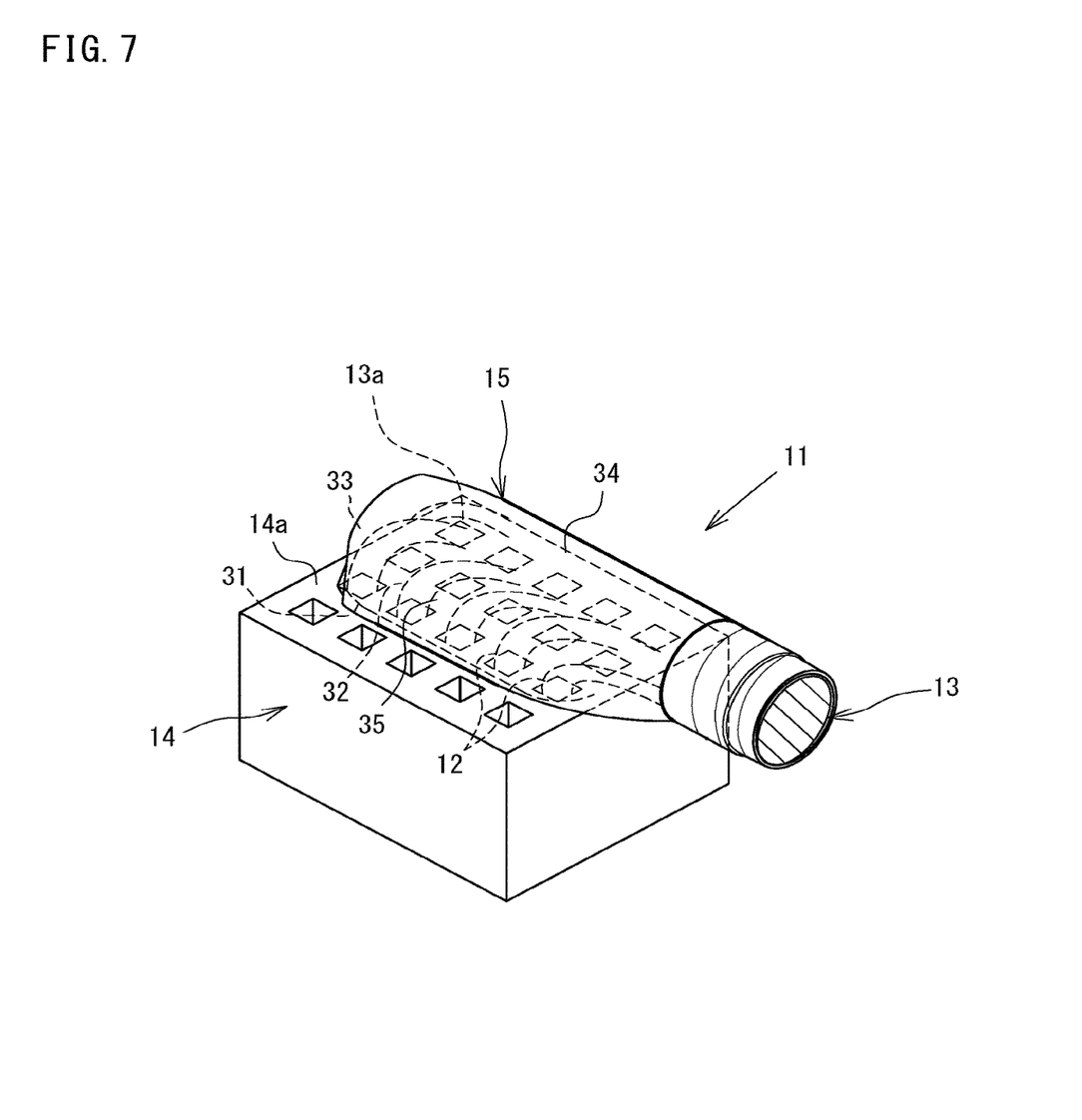
FIG. 7 is a partially cross-sectioned perspective view of a wire harness wire end protection structure to which the present invention is applicable.

The wire end protection portion 15 is secured only to the wire bundle 13 portion, but is not secured to the connector 14. Therefore, it is not needed to match the shape of the sheet member 15a to the shape of the connector 14. Namely, it is merely needed to adapt the shape of the sheet member 15a to the shape of a portion of the wire lead-out surface 14a of the connector 14 through which the electric wires 12 are led out and the shape of the bent portion 13a. FIG. 7, for example, shows a case where the size and the shape of the connector 14 are different from those of the connector 14 shown in FIG. 6. Even in this case, as long as the number and the positional arrangement of the electric wires 12 to be led out are the same as, or close to, those of the connector 14 shown in FIG. 6, the shape of the bent portion 13a may be the same or similar. Thus, the same sheet member 15a may be used to protect the electric wires 12.

Conventionally, a molded product is used to protect the wire end of a wire harness. In such a case, many types of protection elements need to be prepared. With the wire end protection structure according to the present invention, there is no need to prepare many types of protection elements as the sheet member 15a to be used for the wire end protection portion 15. In addition, the cost and the weight of the wire end protection portion 15 are decreased. Especially, the decrease in the weight is advantageous for the wire harness 11 mountable on an automobile.

The counter sides 31 of the wire end protection portion 15 as the wire end protection structure are linear, and therefore, may face the wire lead-out surface 14a uniformly regardless of the size thereof. This is one of the causes that improve the versatility of the wire end protection portion 15. Since the counter sides 31 are linear, the shape of the wire end protection portion 15 is simplified, which also provides effects of making it easier to produce the wire end protection portion 15 and increasing the yield.

Specifically, with this wire end protection structure, the sheet member 15a used to form the wire end protection portion 15 may have a simple shape, for example, a rectangular shape as seen in a plan view. Therefore, as described above, the ease of production and the yield are of a highest level.

Figure 8:
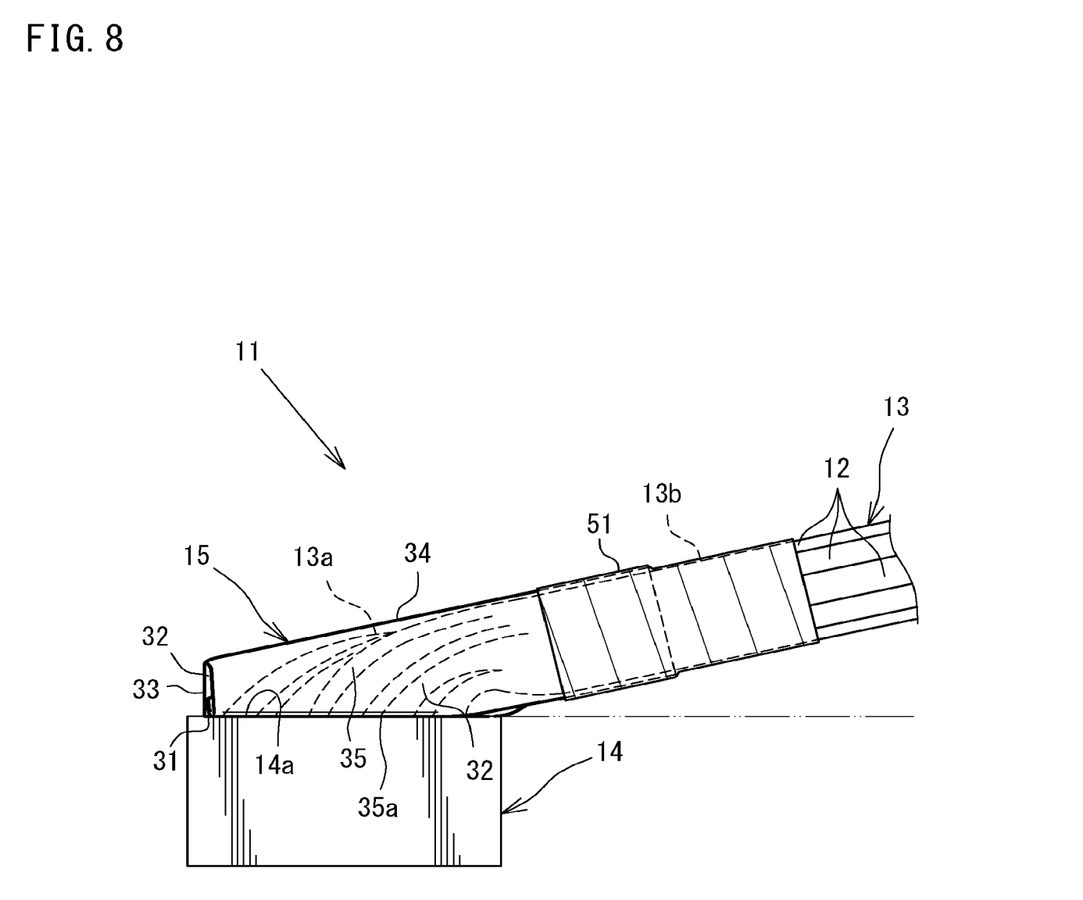
FIG. 8 is a side view of another example of wire harness wire end protection structure to which the present invention is applicable.
Figure 9:
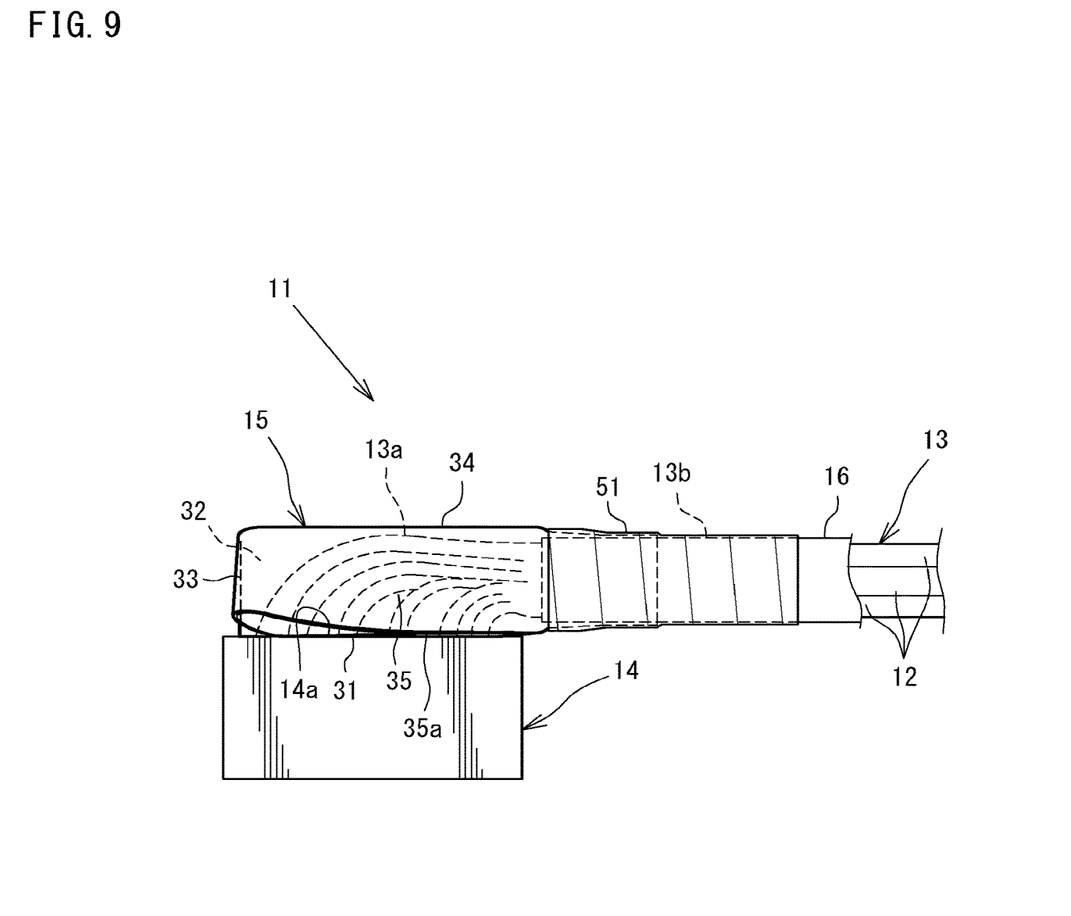
FIG. 9 is a side view of still another example of wire harness wire end protection structure to which the present invention is applicable.

FIG. 8 and FIG. 9 each show another example of the wire end protection portion 15.

In the wire end protection portion 15 shown in FIG. 8, the bending angle of the bent portion 13a with respect to the wire lead-out surface 14a of the connector 14 is smaller than that in the example shown in FIG. 1. The side surface protection portion formation portions 42 of the sheet member 15a have a quadrangular shape accommodating the side-view shape of the bent portion 13a. Even in this case, the same sheet member 15a as that of the example shown in FIG. 1 is usable as the wire end protection portion 15 to be secured. In the example shown in FIG. 8, a portion, of the extending portion 35 of the sheet member 15a, that is to contact the wire lead-out surface 14a of the connector 14 is folded inward to have an appropriate shape and thus to form the portion 35a, which is located at a tip end in the extending direction.

FIG. 9 shows an example in which the sheet member 15a is to be secured to an outer case 16, such as a corrugated tube or the like, into which the wire bundle 13 is inserted. Even in the case of being secured to the outer case 16 in this manner, the sheet 15a protects the wire end of the wire bundle 13 in a similar manner to that described above.

REFERENCE SIGNS LIST

11 Wire harness
12 Wire
13 Wire bundle
13a Bent portion
14 Connector
14a Wire lead-out surface
15 Wire end protection portion
15a Sheet member
31 Counter side
32 Side surface protection portion
33 Tip end protection portion
34 Top protection portion
36 Pressure-sensitive adhesive

The invention claimed is:

1. A wire harness wire end protection method protecting a wire end of a wire harness, the wire harness including a wire bundle and a connector connected therewith, the wire bundle including the wire end, the wire end including a bent portion and facing the connector, the method comprising:
a first covering step of folding a sheet member formed of a foldable material along a phantom line perpendicular to a wire lead-out surface of the connector, thereby forming a tip end protection portion covering a tip end, in a longitudinal direction, of the bent portion of the wire bundle, forming counter sides that are each a part of an outer circumferential edge of the sheet member, that face the wire lead-out surface of the connector, and that are respectively located along two side surfaces of the bent portion, and forming side surface covering portions that are respectively provided with the counter sides and cover the two side surfaces of the bent portion, the tip end protection portion, the counter sides and the side surface covering portions being formed concurrently;

a second covering step of folding, toward the wire lead-out surface, a portion of the side surface covering portions that extends beyond the bent portion in a direction opposite to the wire lead-out surface, thereby forming a top protection portion covering a portion of the bent portion that is opposite to the wire lead-out surface, and also forming the side surface covering portions into side surface protection portions covering the side surfaces of the bent portion; and a securing step of securing the sheet member to a wire bundle portion while keeping the counter sides in a facing state of facing the wire lead-out surface.

2. The wire harness wire end protection method according to claim 1, wherein the counter sides are put into contact with the wire lead-out surface in the first covering step, the second covering step or the securing step.

\* \* \* \* \*